US009569976B2

(12) United States Patent
Krauss et al.

(10) Patent No.: US 9,569,976 B2
(45) Date of Patent: Feb. 14, 2017

(54) METHODS CIRCUITS, DEVICES AND SYSTEMS FOR PERSONALITY INTERPRETATION AND EXPRESSION

(71) Applicants: Gavriel Yaacov Krauss, Beit Shemesh (IL); Marc Daniel Krauss, Beit Shemesh (IL)

(72) Inventors: Gavriel Yaacov Krauss, Beit Shemesh (IL); Marc Daniel Krauss, Beit Shemesh (IL)

( * ) Notice: Subject to any disclaimer, the term of this patent is extended or adjusted under 35 U.S.C. 154(b) by 153 days.

(21) Appl. No.: 14/044,670

(22) Filed: Oct. 2, 2013

(65) Prior Publication Data

US 2014/0099613 A1    Apr. 10, 2014

Related U.S. Application Data

(60) Provisional application No. 61/708,810, filed on Oct. 2, 2012.

(51) Int. Cl.
*G06F 9/00* (2006.01)
*G09B 5/06* (2006.01)
*G06N 3/00* (2006.01)

(52) U.S. Cl.
CPC ............... *G09B 5/06* (2013.01); *G06N 3/008* (2013.01)

(58) Field of Classification Search
None
See application file for complete search history.

(56) References Cited

U.S. PATENT DOCUMENTS

| 4,923,428 | A  | * | 5/1990  | Curran          | 446/175      |
|-----------|----|---|---------|-----------------|--------------|
| 6,551,165 | B2 | * | 4/2003  | Smirnov         | 446/175      |
| 6,554,679 | B1 | * | 4/2003  | Shackelford et al. | 446/268   |
| 6,585,556 | B2 | * | 7/2003  | Smirnov         | 446/175      |
| 6,629,242 | B2 | * | 9/2003  | Kamiya et al.   | 713/100      |
| 8,483,873 | B2 | * | 7/2013  | Wong et al.     | 700/245      |
| 8,565,922 | B2 | * | 10/2013 | Kidd            | 700/259      |
| 8,636,558 | B2 | * | 1/2014  | Eyzaguirre et al. | 446/330    |
| 8,926,395 | B2 | * | 1/2015  | Zheng           | 446/268      |
| 2001/0001318 | A1 | * | 5/2001 | Kamiya       | F24F 11/006  |
|           |    |   |         |                 | 700/246      |
| 2002/0081937 | A1 | * | 6/2002 | Yamada et al.   | 446/175      |
| 2005/0154594 | A1 | * | 7/2005 | Beck            | 704/276      |
| 2005/0215171 | A1 | * | 9/2005 | Oonaka          | 446/301      |
| 2011/0296003 | A1 | * | 12/2011 | McCann et al.  | 709/224      |

* cited by examiner

*Primary Examiner* — Sunit Pandya

(57) ABSTRACT

The present invention includes methods circuits, devices and systems for personality interpretation and expression. A personality interpretation and expression system may include central processing logic in addition to a personality engine. The central processing logic may be adapted to generate a data set corresponding to collected user and/or environment information. The personality engine may be adapted to evaluate a data set received from the central processing logic and generate at least one interaction instruction corresponding to the data set. Generating an interaction instruction is at least partially based on a comparison between the data set and a data set in a personality database functionally associated with or otherwise integral to the personality engine.

20 Claims, 6 Drawing Sheets

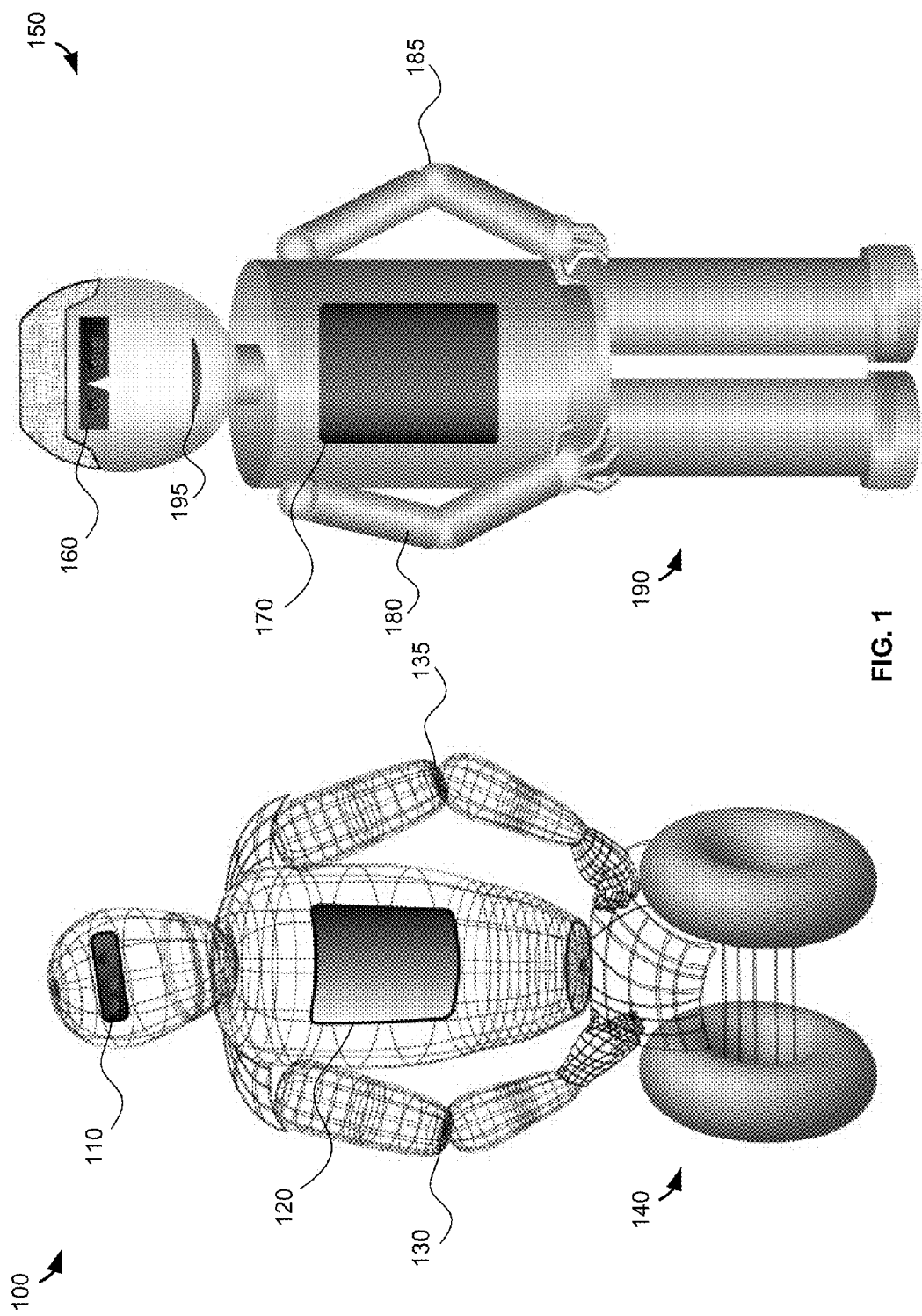

METHODS CIRCUITS, DEVICES AND SYSTEMS FOR PERSONALITY INTERPRETATION AND EXPRESSION

CROSS-REFERENCE

This application claims the benefit of U.S. Provisional Patent application 61/708,810, entitled "Methods circuits devices and systems for autonomous mentoring and teaching", filed Oct. 2, 2012, the entire disclosure of which is incorporated herein by reference.

FIELD OF THE INVENTION

The present invention relates generally to the field of data processing. More specifically, the present invention relates to methods, circuits, devices and systems for personality interpretation and expression.

BACKGROUND

There are approximately twenty million American children between the ages of seven and twelve in the United States, of which approximately ten percent (two million) are diagnosed with Attention deficit hyperactivity disorder (ADHD). Additionally, ten percent of children are diagnosed with specific learning disabilities (LD). Considering a twenty percent overlap in these two populations, there are approximately three and a half million children, ages seven to twelve, with ADHD, LD or both. Parents of ADHD and LD children encounter difficulty helping their children complete homework, keep their work organized, study for tests and practice reading. These children often refuse to perform other responsibilities, such as taking a shower, leading to arguments in the house.

Children with ADHD have difficulty sustaining attention unless the task at hand is compelling and entertaining. Likewise, children with LD are often frustrated with how difficult it is to learn, causing them to be disinterested and unfocused unless the learning is compelling and entertaining.

Since parents care so much about the education of their children, alternative teaching and mentoring experiences can fill an important role in facilitating a child's educational growth. For example, a robot can alleviate some of this burden and work with children in an engaging and fun way. The robot can teach reading, practice for tests (e.g. spelling and math), keep homework organized, encourage the completion of basic chores and play games with the children, all in a manner that capitalizes on the relationship the child develops with the robot. Since the robot can interpret a child's comment and respond with a psychologically sound comment, the child can develop a personal connection to the robot. As the robot fosters this connection, the robot can motivate a child to maintain positive feelings and behaviors while improving upon negative feelings and behaviors.

The need for robot-assisted education for children with learning disabilities is self-evident. There is thus a need in the field of data processing for improved methods, circuits, devices and systems for personality interpretation and expression.

SUMMARY OF THE INVENTION

The present invention includes methods circuits, devices and systems for personality interpretation and expression. According to some embodiments of the present invention, a personality interpretation and expression system may include central processing logic in addition to a personality engine. The central processing logic may be adapted to generate a data set corresponding to collected user and/or environment information. The personality engine may be adapted to evaluate a data set received from the central processing logic and generate at least one interaction instruction corresponding to the data set. According to further embodiments of the present invention, generating an interaction instruction is at least partially based on a comparison between the data set and a data set in a personality database functionally associated with or otherwise integral to the personality engine.

According to some embodiments of the present invention, the personality engine may include a decision algorithm processor for comparing one or more data sets. The decision algorithm processor may compare a received data set with a personality database data set, one or more personality database data sets, and/or a personality database data set with a data set for transmission. According to some embodiments of the present invention, the personality database may include one or more data repositories, e.g. a gesture data repository, an input text data repository, a speech data repository, a visual data repository or a data repository of any personality related data type.

According to some embodiments of the present invention, the decision algorithm processor may receive gesture, text, visual and/or speech input data from the functionally associated central processing logic. According to further embodiments of the present invention, the decision algorithm processor may match gesture input data with an input gesture data entry from a functionally associated gesture data repository. According to further embodiments of the present invention, the decision algorithm processor may match text input data with an input text data entry from a functionally associated input text data repository. According to further embodiments of the present invention, the decision algorithm processor may match speech input data with an input speech data entry from a functionally associated speech data repository. According to further embodiments of the present invention, the decision algorithm processor may match visual input data with an input visual data entry from a functionally associated visual data repository.

According to some embodiments of the present invention where exact matches are not found for all input data, the decision algorithm processor may transmit an update query to the central processing logic. The central processing logic may generate a user prompt to obtain update data. According to further embodiments of the present invention, after receiving update data from the central processing logic, the decision algorithm processor may update one or more data repositories with corresponding update data.

According to some embodiments of the present invention, when exact matches are found for all input data and/or after updating the one or more data repositories with corresponding update data, the decision algorithm processor may generate an ID corresponding to the input data. According to further embodiments of the present invention, the decision algorithm processor may match the ID with one or more data entries from: a gesture data repository, a text data repository, a visual data repository and/or a speech data repository. According to further embodiments of the present invention, the decision algorithm processor may generate at least one interaction instruction corresponding to matching gesture, visual, text and/or speech data. The interaction instruction may be transmitted to a functionally associated control system (e.g. a robotics controller) and/or a functionally associated output device for execution (e.g. a monitor or screen).

According to some embodiments of the present invention, a control system for a mentoring and/or teaching robot may include a sensor array, central processing logic and a personality engine. The sensor array may be adapted to collect user and/or environment information. The central processing logic may be adapted to generate a data set corresponding to information received from the sensor array. The personality engine may be adapted to evaluate a data set received from the central processing logic and generate at least one interaction instruction corresponding to the data set. According to further embodiments of the present invention, generating an interaction instruction is at least partially based on a comparison between the data set and a data set in a personality database functionally associated with or otherwise integral to the personality engine.

According to some embodiments of the present invention, the mentoring and/or teaching robot may be designed in a humanoid fashion and may include a humanoid head, torso and/or humanoid arms. The robot may include one or more wheels and/or legs. According to further embodiments of the present invention, the sensor array may resemble humanoid eyes and/or one or more humanoid features. According to some embodiments of the present invention, the torso may include a display for displaying visual data. According to some embodiments of the present invention, the humanoid arms may be designed for multi-dimensional movement. The humanoid arms may have grasping claws and/or hands.

According to some embodiments of the present invention, the robot may produce one or more facial expressions corresponding to an interaction instruction. The robot may utilize intonations and/or facial expressions substantially matching its speech and/or any associated output. According to further embodiments of the present invention, the robot may interpret a facial expression as an input gesture e.g. daydreaming, showing anger, procrastinating, etc. According to some embodiments of the present invention, some or all of the humanoid parts and/or features may be controlled by a robotics controller, optionally by executing one or more received interaction instructions.

According to some embodiments of the present invention, the robot may determine, based on a user's speech or any input, an emotional state or behavior pattern of the user. The robot may express a response to the user to substantially reinforce positive emotions and/or behaviors. According to further embodiments of the present invention, the robot may express a response to the user to substantially facilitate improvement of negative emotions and/or behaviors. According to further embodiments of the present invention, an expressed response may be based on at least one data set from the group of speech, text, visual and gesture data sets.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

FIG. 1 shows exemplary robot systems according to some embodiments of the present invention;

Figure 2A:
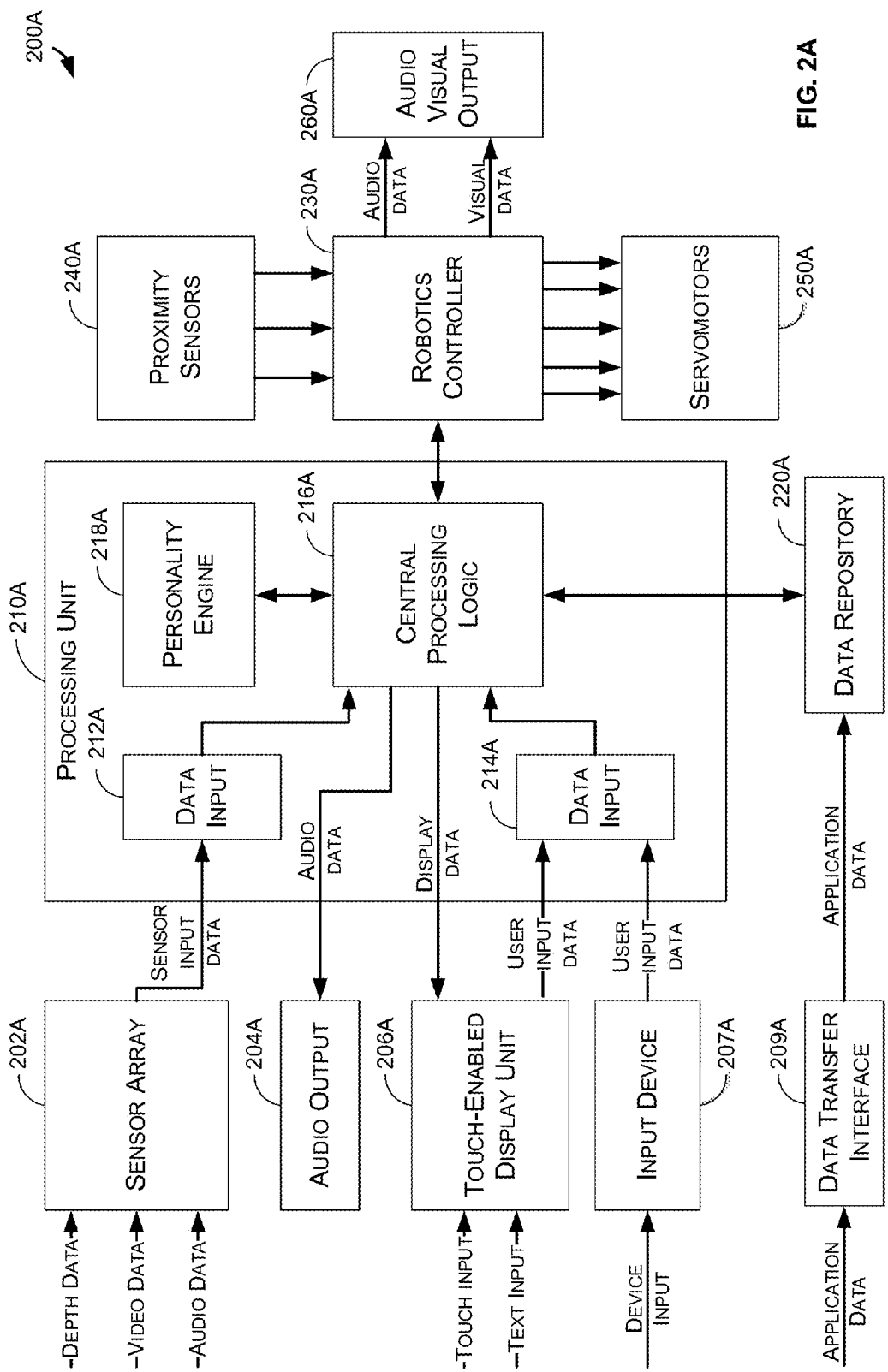
FIG. 2A is a functional block diagram of an exemplary robot system according to some embodiments of the present invention.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION

In the following detailed description, numerous specific details are set forth in order to provide a thorough understanding of the invention. However, it will be understood by those skilled in the art that the present invention may be practiced without these specific details. In other instances, well-known methods, procedures, components and circuits have not been described in detail so as not to obscure the present invention.

Unless specifically stated otherwise, as apparent from the following discussions, it is appreciated that throughout the specification discussions utilizing terms such as "processing", "computing", "calculating", "determining", "generating" or the like, refer to the action and/or processes of a computer or computing system, or similar electronic computing device, that manipulate and/or transform data represented as physical, such as electronic, quantities within the computing system's registers and/or memories into other data similarly represented as physical quantities within the computing system's memories, registers or other such information storage, transmission or display devices.

Embodiments of the present invention may include apparatuses for performing the operations herein. This apparatus may be specially constructed for the desired purposes, or it may comprise a general purpose computer selectively activated or reconfigured by a computer program stored in the computer. Such a computer program may be stored in a computer readable storage medium, such as, but is not limited to, any type of disk including floppy disks, optical disks, CD-ROMs, DVDs, magnetic-optical disks, read-only memories (ROMs), random access memories (RAMs) electrically programmable read-only memories (EPROMs), electrically erasable and programmable read only memories (EEPROMs), magnetic or optical cards, or any other type of media suitable for storing electronic instructions, and capable of being coupled to a computer system bus.

The processes and displays presented herein are not inherently related to any particular computer or other apparatus. Various general purpose systems may be used with programs in accordance with the teachings herein, or it may prove convenient to construct a more specialized apparatus to perform the desired method. The desired structure for a variety of these systems will appear from the description below.

Some embodiments of the present invention may include a personality engine adapted to evaluate a received data set and generate at least one interaction instruction corresponding to the data set. Generating an interaction instruction may be at least partially based on a comparison between the data set and a data set in a personality database functionally associated with or otherwise integral to the personality engine.

According to some embodiments of the present invention, the received data set may be received from an integral or otherwise functionally associated processing logic. According to some embodiments of the present invention, the personality engine may further comprise a decision algorithm processor adapted to compare one or more data sets. According to some embodiments of the present invention, the personality database may include at least one data repository from the group of data repositories including: a gesture data repository, an input text data repository, a speech data repository and a visual data repository.

According to some embodiments of the present invention, the interaction instruction may be at least partially based on an emotional state or behavior pattern of a user. According to further embodiments of the present invention, the interaction instruction may be substantially generated to reinforce positive user emotions and/or behaviors. According to further embodiments of the present invention, the interaction instruction may be substantially generated to facilitate improvement of negative user emotions and/or behaviors.

Some embodiments of the present invention may include a method of personality interpretation and expression comprising: collecting user information; generating a data set corresponding to the user information; comparing the data set to a data set in a personality database; and generating an interaction instruction.

According to some embodiments of the present invention, collecting user information may further comprise receiving input from at least one integral or otherwise functionally associated sensor. According to some embodiments of the present invention, comparing the data set to a data set in a personality database may further comprise comparing the data set to at least one data repository from the group of data repositories including: a gesture data repository, an input text data repository, a speech data repository and a visual data repository.

According to some embodiments of the present invention, generating an interaction instruction may be at least partially based on an emotional state or behavior pattern of a user. According to further embodiments of the present invention, an interaction instruction may be generated to substantially reinforce positive user emotions and/or behaviors. According to further embodiments of the present invention, an interaction instruction may be generated to substantially facilitate improvement of negative user emotions and/or behaviors.

Some embodiments of the present invention may include a robot control system comprising: a sensor array adapted to collect user information; a central processing logic adapted to generate a data set corresponding to information received from the sensor array; and a personality engine adapted to evaluate a data set received from the central processing logic and generate at least one interaction instruction corresponding to the data set. Generating an interaction instruction may be at least partially based on a comparison between the data set and a data set in a personality database functionally associated with or otherwise integral to the personality engine.

According to some embodiments of the present invention, the personality engine may further comprise a decision algorithm processor adapted to compare one or more data sets. According to some embodiments of the present invention, the personality database may include at least one data repository from the group of data repositories including: a gesture data repository, an input text data repository, a speech data repository and a visual data repository.

According to some embodiments of the present invention, the interaction instruction may be at least partially based on an emotional state or behavior pattern of a user. According to further embodiments of the present invention, the interaction instruction may be substantially generated to reinforce positive user emotions and/or behaviors. According to some embodiments of the present invention, the interaction instruction may be substantially generated to facilitate improvement of negative user emotions and/or behaviors.

According to some embodiments of the present invention, the robot control system may further comprise a robotics controller adapted to convert an interaction instruction into interactive speech, text, visual and/or gesture output.

Now turning to FIG. 1, there are shown exemplary robot systems according to some embodiments of the present invention. According to some embodiments of the present invention, a robot system (100) may be designed in a humanoid fashion and may include a humanoid head, torso and/or humanoid arms (130 & 135). The robot system may include one or more wheels (140) for mobility and balance. According to some embodiments of the present invention, the humanoid head may include a sensor array (110) for collecting user and/or environment data. According to further embodiments of the present invention, the sensor array may resemble humanoid eyes and/or one or more humanoid features (110). According to some embodiments of the present invention, the torso may include a display (120) for displaying visual data. According to some embodiments of the present invention, the humanoid arms (130 & 135) may be designed for multi-dimensional movement. The humanoid arms (130 & 135) may have grasping claws and/or hands.

According to some embodiments of the present invention, a humanoid robot system (150) may include a humanoid head, torso, arms (180 & 185) and/or legs (190). According to some embodiments of the present invention, the humanoid head may include a sensor array (160) for collecting user and/or environment data. According to further embodiments of the present invention, the sensor array (160) may resemble humanoid eyes and/or one or more humanoid features. According to some embodiments of the present invention, the torso may include a display (170) for displaying visual data. According to some embodiments of the present invention, the humanoid arms (180 & 185) may be designed for multi-dimensional movement. The humanoid arms (180 & 185) may have grasping claws and/or hands.

According to some embodiments of the present invention, a humanoid robot system (150) may include a mouth (195) to produce one or more facial expressions. The robot may utilize intonations and/or facial expressions substantially matching its speech and/or any associated output.

Figure 2B:
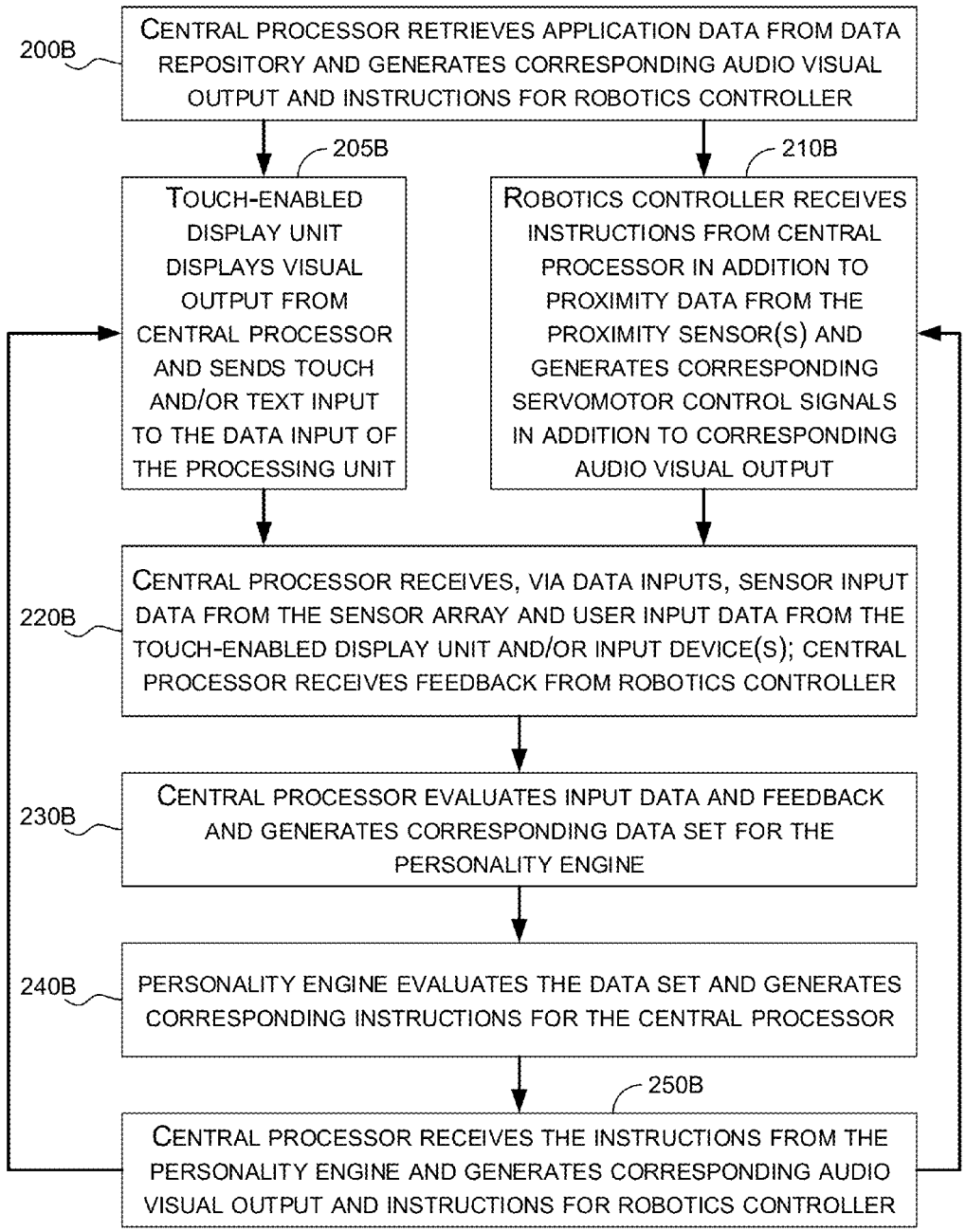
FIG. 2B is a flowchart including the steps of an exemplary method by which a robot system according to some embodiments of the present invention may gather input data, evaluate the data and produce a corresponding output response.

Now turning to FIG. 2A, there is shown a functional block diagram of an exemplary robot system (200A) according to some embodiments of the present invention. The operation of the robot system may be described in view of FIG. 2B which is a flowchart including the steps of an exemplary method by which a robot system according to some embodiments of the present invention may gather input data, evaluate the data and produce a corresponding output response.

According to some embodiments of the present invention, the robot system (200A) may include a sensor array (202A) for collecting depth, video and/or audio data from at least one integral or otherwise functionally associated depth, video and/or audio sensor. According to some embodiments of the present invention, the robot system (200A) may include a touch-enabled display unit (206A) for collecting touch and/or text input. The touch-enabled display unit (206A) may be removable and/or may communicate with the robot system (200A) via a data interface. According to further embodiments of the present invention, the robot system (200A) may include an input device (207A) for collecting user input data. According to some embodiments, the robot system (200A) may include a data transfer interface (209A) for receiving application data, which application data may be stored in a data repository (220A) integral to or otherwise functionally associated with the robot system (200A).

According to some embodiments of the present invention, the robot system (200A) may include a processing unit (210A). The processing unit (210A) may include central processing logic (216A), a personality engine (218A) and one or more data inputs (212A & 214A). According to further embodiments of the present invention, the data inputs (212A & 214A) may be integral to the central processing logic (216A).

According to some embodiments of the present invention, the central processing logic (216A) may retrieve (200B) application data from the data repository (220A) and generate corresponding audio visual output. The central processing logic (216A) may generate corresponding instructions for an integral or otherwise functionally associated robotics controller (230A). According to further embodiments of the present invention, the robotics controller (230A) may receive (210B) the instructions from the central processing logic (216A) in addition to proximity data from functionally associated or otherwise integral proximity sensors (240A). The robotics controller (230A) may generate (210B) corresponding servomotor control signals for functionally associated servomotors (250A), in addition to corresponding audio visual output data for functionally associated audio visual output (260A).

According to some embodiments of the present invention, the touch-enabled display unit (206A) may display (205B) visual output generated by the central processing logic (216A). The touch-enabled display unit (206A) may send (205B) touch and/or text input to a data input (214A). According to further embodiments of the present invention, the central processing logic (216A) may receive (220B), via data inputs (212A & 214A), sensor input data from the sensor array (202A) and user input data from the touch-enabled display unit (206A) and/or the input device (207A). According to further embodiments of the present invention, the central processing logic (216A) may receive (220B) feedback from the robotics controller (230A).

According to some embodiments of the present invention, the central processing logic (216A) may evaluate (230B) input data and feedback and may generate a corresponding data set for the personality engine (218A). According to further embodiments of the present invention, the personality engine (218A) may evaluate (240B) the data set and may generate corresponding instructions for the central processing logic (216A). According to further embodiments of the present invention, the central processing logic (216A) may receive (250B) the instructions from the personality engine (218A) and may generate corresponding audio data for a functionally associated audio output (204A), display data for the touch-enabled display unit (206A) and instructions for the robotics controller (230A).

Figure 3A:
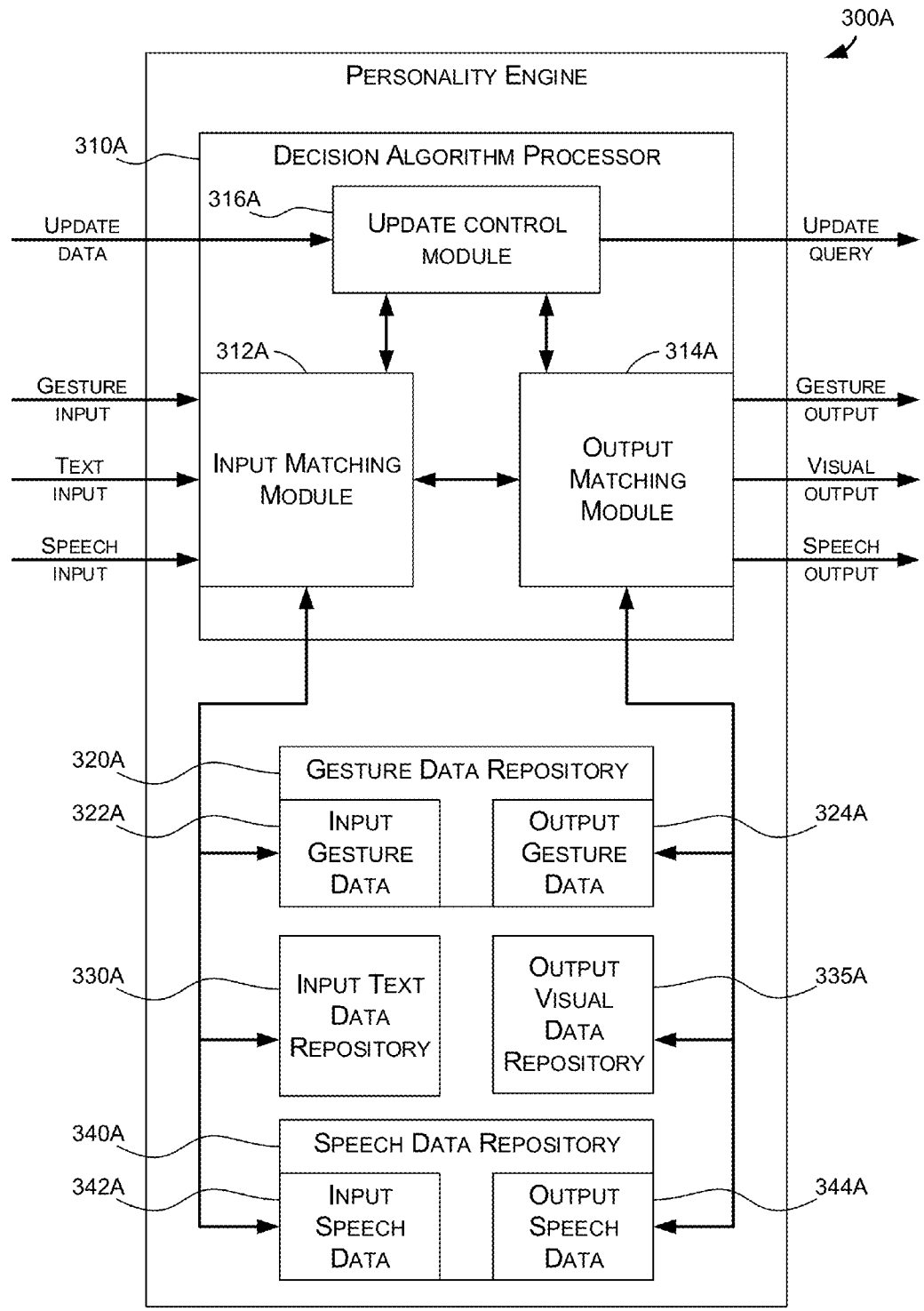
FIG. 3A is a functional block diagram of an exemplary personality engine according to some embodiments of the present invention.
Figure 3B:
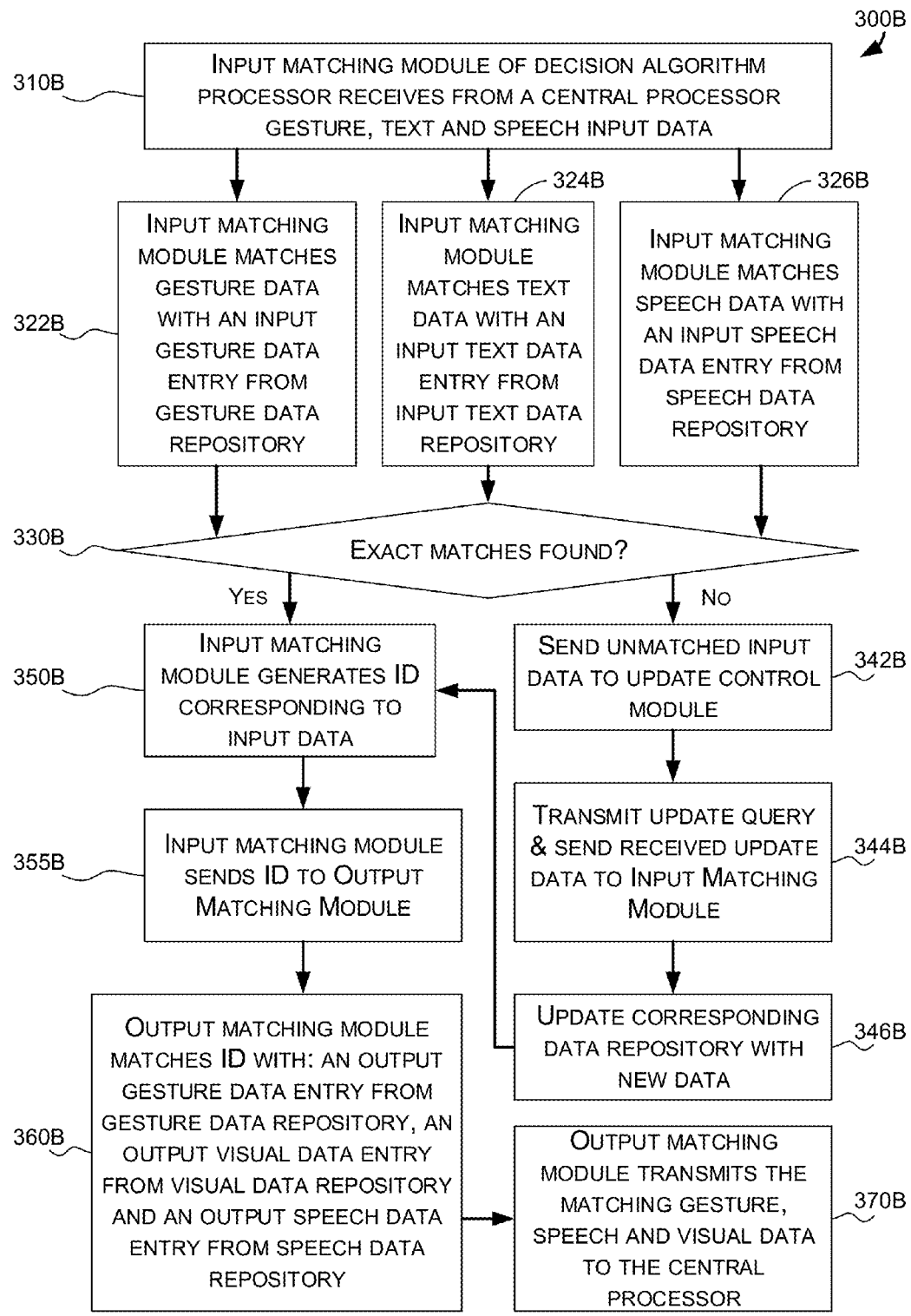
FIG. 3B is a flowchart including the steps of an exemplary method by which a personality engine according to some embodiments of the present invention may process input gesture, text and speech data into corresponding output gesture, visual and speech data.

Now turning to FIG. 3A, there is shown a functional block diagram of an exemplary personality engine (300A) according to some embodiments of the present invention. The operation of the personality engine may be described in view of FIG. 3B which is a flowchart (300B) including the steps of an exemplary method by which a personality engine according to some embodiments of the present invention may process input gesture, text and speech data into corresponding output gesture, visual and speech data.

According to some embodiments of the present invention, a personality engine (300A) may include a decision algorithm processor (310A) in addition to one or more data repositories. The decision algorithm processor (310A) may include an input matching module (312A), an output matching module (314A) and an update control module (316A).

According to some embodiments of the present invention, the input matching module (312A) may receive (310B) gesture, text and/or speech input data. The input data may be received from a functionally associated central processing logic. According to further embodiments of the present invention, the input matching module (312A) may match (322B) gesture input data with an input gesture data entry (322A) from a functionally associated gesture data repository (320A). According to further embodiments of the present invention, the input matching module (312A) may match (324B) text input data with an input text data entry from a functionally associated input text data repository (330A). According to further embodiments of the present invention, the input matching module (312A) may match (326B) speech input data with an input speech data entry (342A) from a functionally associated speech data repository (326A). According to further embodiments of the present invention, the input matching module (312A) may match an additional input data set with a corresponding input data entry from a functionally associated data repository.

According to some embodiments of the present invention where exact matches are not found for all input data (330B), the unmatched input data may be sent (342B) to the update control module (316A). According to further embodiments of the present invention, the update control module (316A) may transmit (344B) an update query to a functionally associated processing unit. After receiving update data (344B), the update control module (316A) may send the update data to the input matching module (312A). The update control module (316A) may send additional update data to the output matching module (314A). According to further embodiments of the present invention, the input matching module (312A) and/or the output matching module (314A) may update (346B) one or more data repositories with corresponding update data.

According to some embodiments of the present invention, when exact matches are found for all input data and/or after updating the one or more data repositories with corresponding update data, the input matching module (312A) may generate (350B) an ID corresponding to the input data. According to further embodiments of the present invention, the input matching module (312A) may send (355B) the ID to the output matching module (314A). According to further embodiments of the present invention, the output matching module (314A) may match (360B) the ID with: an output gesture data entry (324A) from the gesture data repository (320A), an output visual data entry from a visual data repository (335A), an output speech data entry (344A) from a speech data repository (340A) and/or an additional output data entry from an associated data repository. According to further embodiments of the present invention, the output matching module (314A) may transmit (370B) the matching gesture, speech and visual data to the functionally associated central processing logic.

Figure 4:
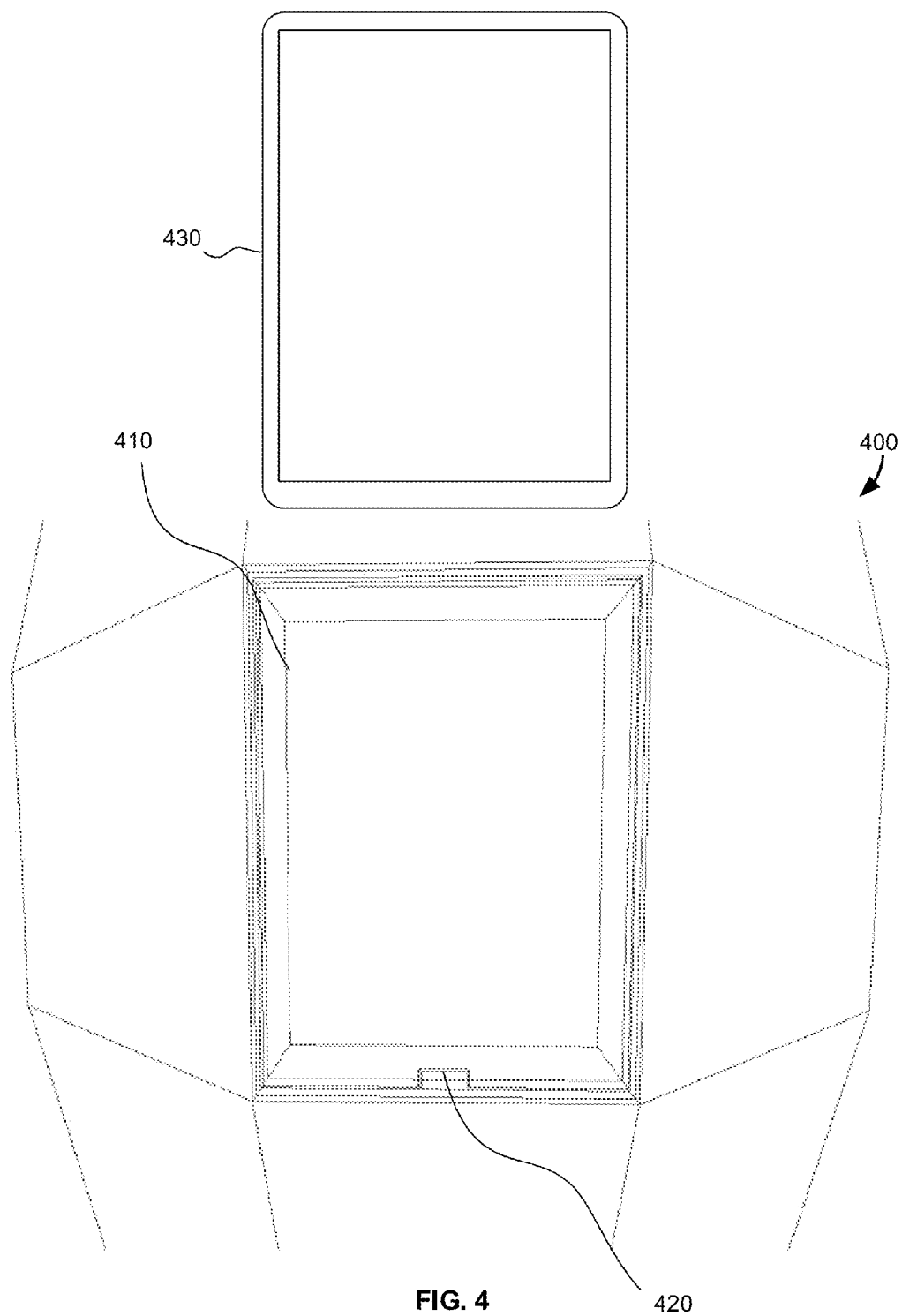
FIG. 4 shows a portion of an exemplary robot system according to some embodiments of the present invention.

Now turning to FIG. 4, there is shown a portion of an exemplary robot system (400) according to some embodiments of the present invention. The robot system (400) may include a location for docking a tablet, smartphone and/or a mobile computing device with a touchscreen (430). The location may be a recessed area designed to fit one or more shapes and/or styles of dock-able devices (410). The robot system (400) may include one or more device adapters (420) for interfacing with a docked device.

According to some embodiments of the present invention, a docked device (430) may include at least one input sensor integral to or functionally associated with the robot system (400). According to some embodiments of the present invention, the docked device (430) may comprise at least a portion of a central processing logic of the robot system (400). According to some embodiments of the present invention, the docked device (430) may comprise and/or run at least a portion of a personality engine integral to or functionally associated with the robot system (400).

Some embodiments of the invention, for example, may take the form of an entirely hardware embodiment, an entirely software embodiment, or an embodiment including both hardware and software elements. Some embodiments may be implemented in software, which includes but is not limited to firmware, resident software, microcode, or the like.

Furthermore, some embodiments of the invention may take the form of a computer program product accessible from a computer-usable or computer-readable medium providing program code for use by or in connection with a computer or any instruction execution system. For example, a computer-usable or computer-readable medium may be or may include any apparatus that can include, store, communicate, propagate, or transport the program for use by or in connection with the instruction execution system, apparatus, or device.

In some embodiments, the medium may be an electronic, magnetic, optical, electromagnetic, infrared, or semiconductor system (or apparatus or device) or a propagation medium. Some demonstrative examples of a computer-readable medium may include a semiconductor or solid state memory, magnetic tape, a removable computer diskette, a random access memory (RAM), a read-only memory (ROM), a rigid magnetic disk, and an optical disk. Some demonstrative examples of optical disks include compact disk—read only memory (CD-ROM), compact disk—read/write (CD-R/W), and DVD.

In some embodiments, a data processing system suitable for storing and/or executing program code may include at least one processor coupled directly or indirectly to memory elements, for example, through a system bus. The memory elements may include, for example, local memory employed during actual execution of the program code, bulk storage, and cache memories which may provide temporary storage of at least some program code in order to reduce the number of times code must be retrieved from bulk storage during execution.

In some embodiments, input/output or I/O devices (including but not limited to keyboards, displays, pointing devices, etc.) may be coupled to the system either directly or through intervening I/O controllers. In some embodiments, network adapters may be coupled to the system to enable the data processing system to become coupled to other data processing systems or remote printers or storage devices, for example, through intervening private or public networks. In some embodiments, modems, cable modems and Ethernet cards are demonstrative examples of types of network adapters. Other suitable components may be used.

Functions, operations, components and/or features described herein with reference to one or more embodiments, may be combined with, or may be utilized in combination with, one or more other functions, operations, components and/or features described herein with reference to one or more other embodiments, or vice versa.

While certain features of the invention have been illustrated and described herein, many modifications, substitutions, changes, and equivalents will now occur to those skilled in the art. It is, therefore, to be understood that the appended claims are intended to cover all such modifications and changes as fall within the true spirit of the invention.

The invention claimed is:

1. A control system adapted to control an interactive robot, said control system comprising:
a memory adapted to associate robot personality data with interaction instruction data, wherein said robot personality data comprises verbal communication data and nonverbal communication data;
a robotics controller adapted to generate a control signal for at least one integral or otherwise functionally associated actuator, effector, audio output device or visual output device, wherein generating a control signal is based on at least one interaction instruction;
verbal communication means comprising at least one audio input and adapted to collect verbal communication data from a user;
nonverbal communication means comprising at least one visual input and adapted to collect nonverbal communication data from said user; and
a processor adapted to generate a user preference data set corresponding to collected verbal communication data and/or nonverbal communication data from said user,
wherein said memory is further adapted to associate said user preference data with said robot personality data, and
wherein said processor is further adapted to determine a primary user preference from said user preference data set and select associated robot personality data for interaction with said user.

2. The robot control system according to claim 1, wherein said processor is further adapted to generate said user preference data set at least partially based on an emotional state or behavior pattern of a user.

3. The robot control system according to claim 2, wherein said processor is further adapted to determine said primary user preference based on an increased likelihood that an associated robot interaction will reinforce positive user emotions and/or behaviors.

4. The robot control system according to claim 2, wherein said processor is further adapted to determine said primary user preference based on an increased likelihood that an associated robot interaction will facilitate improvement of negative user emotions and/or behaviors.

5. The robot control system according to claim 1, wherein said processor is further adapted to generate a user preference data set corresponding to data received from at least one from the group of a local storage, a network attached storage, a removable storage, and a remote storage.

6. The robot control system according to claim 1, wherein said verbal communication data further comprises speech data.

7. The robot control system according to claim 1, wherein said nonverbal communication data further comprises gesture data.

8. The robot control system according to claim 1, wherein said robotics controller is further adapted to generate a wireless control signal for at least one integral or otherwise functionally associated mobile computing device.

9. The robot control system according to claim 8, wherein said mobile device is a smartphone, tablet, slate or any internet-connected device.

10. The robot control system according to claim 8, wherein said processor is further adapted to generate a user preference data set corresponding to data received from said mobile computing device.

11. A control method for controlling operation of an interactive robot, said interactive robot being capable of processing verbal communication data and nonverbal communication data from a conversation with a user, said interactive robot comprising a memory adapted to associate robot personality data with interaction instruction data, wherein said robot personality data comprises verbal communication data and nonverbal communication data; said method comprising:
  collecting verbal communication data from a user;
  collecting nonverbal communication data from said user;
  generating a user preference data set corresponding to collected verbal communication data and/or nonverbal communication data from said user;
  associating said user preference data with said robot personality data;
  determining a primary user preference from said user preference data set;
  selecting robot personality data associated with said primary user preference;
  selecting an interaction instruction associated with said robot personality data for interaction with said user; and
  generating a control signal, based on said interaction instruction, for at least one integral or otherwise functionally associated actuator, effector, audio output device or visual output device.

12. The method according to claim 11, wherein generating said user preference data set is at least partially based on an emotional state or behavior pattern of a user.

13. The method according to claim 12, wherein determining said primary user preference is based on an increased likelihood that an associated robot interaction will reinforce positive user emotions and/or behaviors.

14. The method according to claim 12, wherein determining said primary user preference is based on an increased likelihood that an associated robot interaction will facilitate improvement of negative user emotions and/or behaviors.

15. The method according to claim 11, wherein generating a user preference data set corresponds to data received from at least one from the group of a local storage, a network attached storage, a removable storage, and a remote storage.

16. The method according to claim 11, wherein said verbal communication data further comprises speech data.

17. The method according to claim 11, wherein said nonverbal communication data further comprises gesture data.

18. The method according to claim 11, wherein generating a control signal further comprises generating a wireless control signal for at least one integral or otherwise functionally associated mobile computing device.

19. The method according to claim 18, wherein generating a wireless control signal further comprises generating a control signal for a smartphone, tablet, slate or any internet-connected device.

20. The method according to claim 18, wherein generating a user preference data set corresponds to data received from said mobile computing device.

* * * * *